United States Patent
Cantley et al.

(10) Patent No.: US 6,877,722 B2
(45) Date of Patent: Apr. 12, 2005

(54) PLASTIC FENCING SIMULATIVE OF WROUGHT IRON

(76) Inventors: Richard W. Cantley, 2065 Golfview Dr., Apt., 102, Troy, MI (US) 48084; Howard Sagermann, 51 Weller Ct., Cobourg (CA), K9A 5K3; Brian David Wood, 8150 Danforth Rd. W., Cobourg (CA), K9H 4Z3; Peter Paul Heysel, 156 Wolsely St., Peterborough (CA), K9H 4Z3; Frederick J. Wheeler, 188 Bay Meadows Dr., Holland, MI (US) 49424

( * ) Notice: Subject to any disclaimer, the term of this patent is extended or adjusted under 35 U.S.C. 154(b) by 64 days.

(21) Appl. No.: 10/644,251

(22) Filed: Aug. 20, 2003

(65) Prior Publication Data

US 2004/0119060 A1 Jun. 24, 2004

Related U.S. Application Data

(63) Continuation-in-part of application No. 10/361,098, filed on Feb. 6, 2003.
(60) Provisional application No. 60/358,258, filed on Feb. 20, 2002.

(51) Int. Cl.[7] .................................................. B25G 3/00
(52) U.S. Cl. ...................... 256/65.05; 403/187; 403/192; 256/65.04
(58) Field of Search .............................. 256/59, 65.04, 256/65.05, 65.06; 403/187, 188, 403, 382, 192; 411/437, 435

(56) References Cited

U.S. PATENT DOCUMENTS

| | | | |
|---|---|---|---|
| 3,933,311 A | 1/1976 | Lemelson | |
| 4,070,007 A | 1/1978 | Minor | |
| 4,074,893 A | * 2/1978 | Coltrin | ............... 256/65.05 X |
| 4,477,058 A | 10/1984 | Lowery | |
| 4,722,514 A | 2/1988 | Pettit | |
| 5,215,290 A | 6/1993 | Khalessi | |
| 5,255,897 A | 10/1993 | Pepper | |
| 5,613,664 A | 3/1997 | Svalbe | |
| 5,657,967 A | 8/1997 | Patrick | |
| 5,702,090 A | 12/1997 | Edgman | |
| 5,938,184 A | 8/1999 | DeSouza | |
| 6,131,885 A | 10/2000 | Berg et al. | |
| 6,173,944 B1 | 1/2001 | McCarthy | |
| 6,471,192 B1 | * 10/2002 | Erwin | ..................... 256/65.05 |
| 6,557,831 B2 | * 5/2003 | Erwin | ................... 2556/65.04 |
| 2002/0000545 A1 | 1/2002 | Pettit | |
| 2002/0011594 A1 | 1/2002 | DeSouza | |

* cited by examiner

*Primary Examiner*—John Cottingham
(74) *Attorney, Agent, or Firm*—Gifford, Krass, Groh, Sprinkle, Anderson & Citkowski, PC

(57) ABSTRACT

A bracket for supporting an elongated rail with respect to a post includes a bracket body with a rail supporting portion and an attachment portion. The rail supporting portion has an opening defined therein for receiving the end of the rail when the bracket body is installed. The opening has a central axis. The attachment portion has a first surface and a second surface spaced therefrom. A fastener receiving passage is defined from the first surface to the second surface. The passage is formed by a first bore extending from the first surface part way to the second surface and a second bore extending part way from the second surface to the first surface. The first and second bores interconnect to find the passage. The central axis of the first and second bores are each generally parallel to the central axis in the opening. The axis of the first and second bores are offset with respect to one another by a distance greater than half the difference in their widths.

19 Claims, 6 Drawing Sheets

Fig - 7   Fig - 6   Fig - 8

PLASTIC FENCING SIMULATIVE OF WROUGHT IRON

REFERENCE TO RELATED APPLICATIONS

This application is a continuation-in-part of U.S. patent application Ser. No. 10/361,098, filed Feb. 6, 2003, which claims priority to U.S. provisional patent application Ser. No. 60/358,258, filed Feb. 20, 2002, the entire contents of both of which are incorporated herein by reference.

FIELD OF THE INVENTION

The present invention generally relates to injection molded parts and, more specifically, to plastic injection molded fence panels and components.

BACKGROUND

Traditional fencing is typically constructed of wood or metal. Each achieves appearances that property owners find pleasing and desirable, in addition to their basic function of regulating or restricting access. However, wood and metal fencing have drawbacks related to their cost and maintenance. These traditional materials are typically high in cost and labor intensive to construct and install. Weathering generally degrades their finish, necessitating periodic painting or staining.

Wrought iron fencing is a type of fencing that is strong, durable, and provides an easily recognizable and desirable appearance. However, wrought iron fencing tends to be very expensive and heavy to install. Many property owners would appreciate an alternative to wrought iron fencing that achieves a similar appearance without the cost, weight, and maintenance drawbacks.

SUMMARY OF THE INVENTION

The present applicants have a co-pending application directed to injection molded plastic fence panels. The present invention is directed to a bracket designed to support such a fence panel with respect to a fence post, though the present invention has application beyond the specific use. The bracket according to the present invention is designed to attach one of the elongated horizontal rails of the plastic fence panel to the side surface of a vertical post. The bracket includes a bracket body with a rail supporting portion and an attachment portion. The bracket body has an abutment surface. When the bracket body is installed, the abutment surface is positioned against the attachment surface of the post. The rail supporting portion has an opening defined therein for receiving the end of the rail when the bracket body is in the installed position. The opening has a central axis. The attachment portion has a first surface forming at least part of the abutment surface of the body and a second surface spaced therefrom. A fastener receiving passage is defined for the first surface to the second surface. The passage is formed by a first bore extending from the first surface part way to the second surface and a second bore extending part way from the second surface to the first surface. The first and second bores interconnect to define the passage. The first and second bores each have central axes that are generally parallel to the central axis of the opening in the rail supporting portion. The first bore has a first width and the second bore has a second width. An offset dimension is defined as the lesser of half of the first width and half of the second width. The central axis of the first bore is offset from the central axis of the second bore by a distance greater than the offset dimension such that a fastener extending through the passage is guided into a position that is angled with respect to the central axis of the opening in the rail supporting portion.

BRIEF DESCRIPTION OF THE DRAWINGS

FIG. 6 is a front elevational view of a fence gate;

FIG. 7 is a cross-sectional view of the gate of FIG. 7, taken along lines 7—7;

FIG. 8 is a side view of the gate of FIG. 6;

DETAILED DESCRIPTION OF THE PREFERRED EMBODIMENTS

Figure 1:
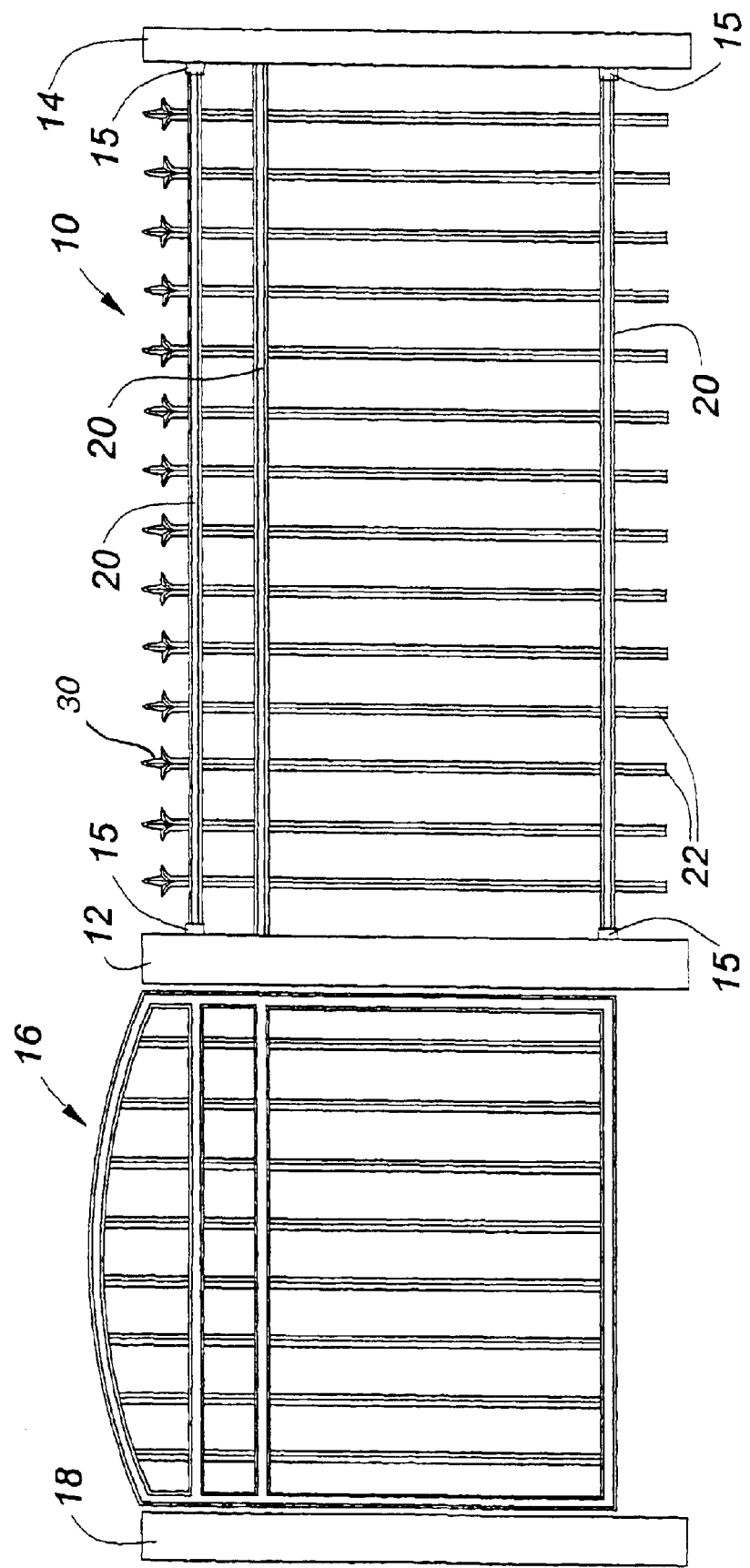
FIG. 1 is a front elevational view of a fence constructed with an injection molded plastic gate, an injection molded plastic fence panel, and a bracket according to the present invention.
Figure 2:
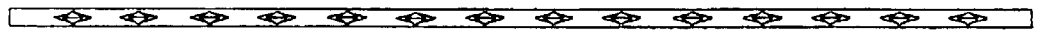
FIG. 2 is a top plan view of the fence panel of FIG. 1.

A portion of a fence constructed with plastic injection molded components is illustrated in FIG. 1. The fence includes a fence panel or section 10 supported between a pair of posts 12 and 14. The fence panel 10 may be interconnected with the post 12 and 14 in a variety of ways, such as using brackets 15 or hangers. The fence post may take a variety of forms, but is preferably of two types. The fence post 12 is a large embodiment of a fence post, and includes a 4×4 post, illustratively a wooden post, that is set into the ground, with a plastic cover around the post. This creates a very rigid post. The post 14 is a smaller embodiment of a post, and is preferably plastic, without a wood core. The larger version of fence post 12 is preferably used at corners, at each side of a gate, and as needed along long runs of fencing to provide structural integrity. The smaller versions of fence post 14 may be used with intermediate fence panels 10 where less structure is required. FIG. 1 also illustrates a gate 16 positioned between post 12 and the post 18, both of which are larger, more structural, posts. A variety of latches and hinges may be used for supporting the gate to one of the posts and latching it to the other.

The fence components 10–18 are of a particular style designed to simulate a wrought iron fence. However, various aspects of the present invention may be used with fence of other styles and to simulate other designs.

A single fence panel 10 is illustrated in more detail in FIGS. 2–5. As will be clear to those of skill in the art, multiple panels 10 may be arranged end-to-end, preferably with fence posts interposed, so as to form a fence, which may extend in a single direction or include corners and enclose an area.

As with known styles of wrought iron fencing, the fence panel 10 includes a plurality of horizontal rails 20 that extend between the fence posts 12 and 14. As shown, the horizontal rails 20 are generally parallel to each other, with two rails provided close to one another near the top of the fence panel 10, and a single rail 20 provided near the bottom of the fence panel. As will be clear to those of skill in the art, other designs may include different numbers and arrangements of horizontal rails 20. Preferably, one end of each of the horizontal rails 20 abuts the post 12, and the other end of the rails 20 abut the post 14. Preferably, at least two of the horizontal rails 20 are connected to each of the posts 12 and 14 using a bracket or hanger. The rails 20 may be terminated in other ways, or may be longer or shorter than illustrated.

As also shown, the fence panel 10 includes a plurality of spaced apart vertical members 22. Each of the vertical members 22 extends between and interconnects with the horizontal rails 20. In a preferred embodiment, the vertical members 22 and the horizontal rails 20 may be said to lie in the same plane, rather than above or below one another. That is, each of the vertical members 22 and horizontal rails 20 has a centerline or central axis, with each of the axes lying generally in the same plane. Alternatively, some of the members 22 or rails 20 may be offset from the common plane to achieve certain structural or design goals.

Figure 5:
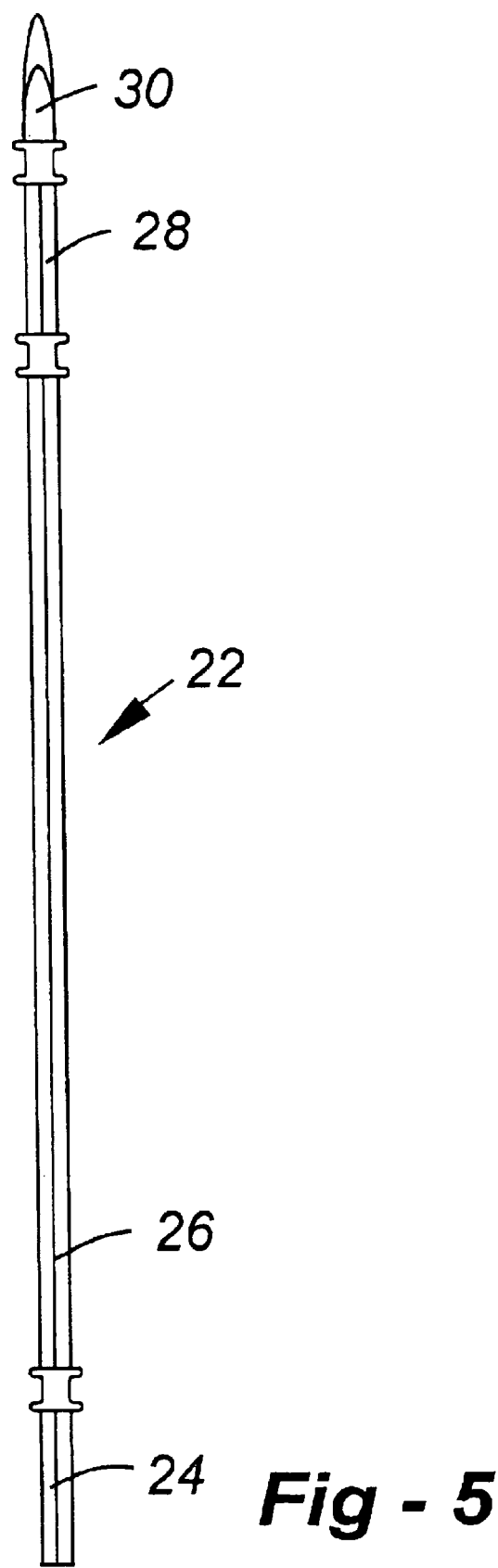
FIG. 5 is a cross-sectional view of the fence panel of FIG. 3, taken along lines 5—5.
Figure 9:
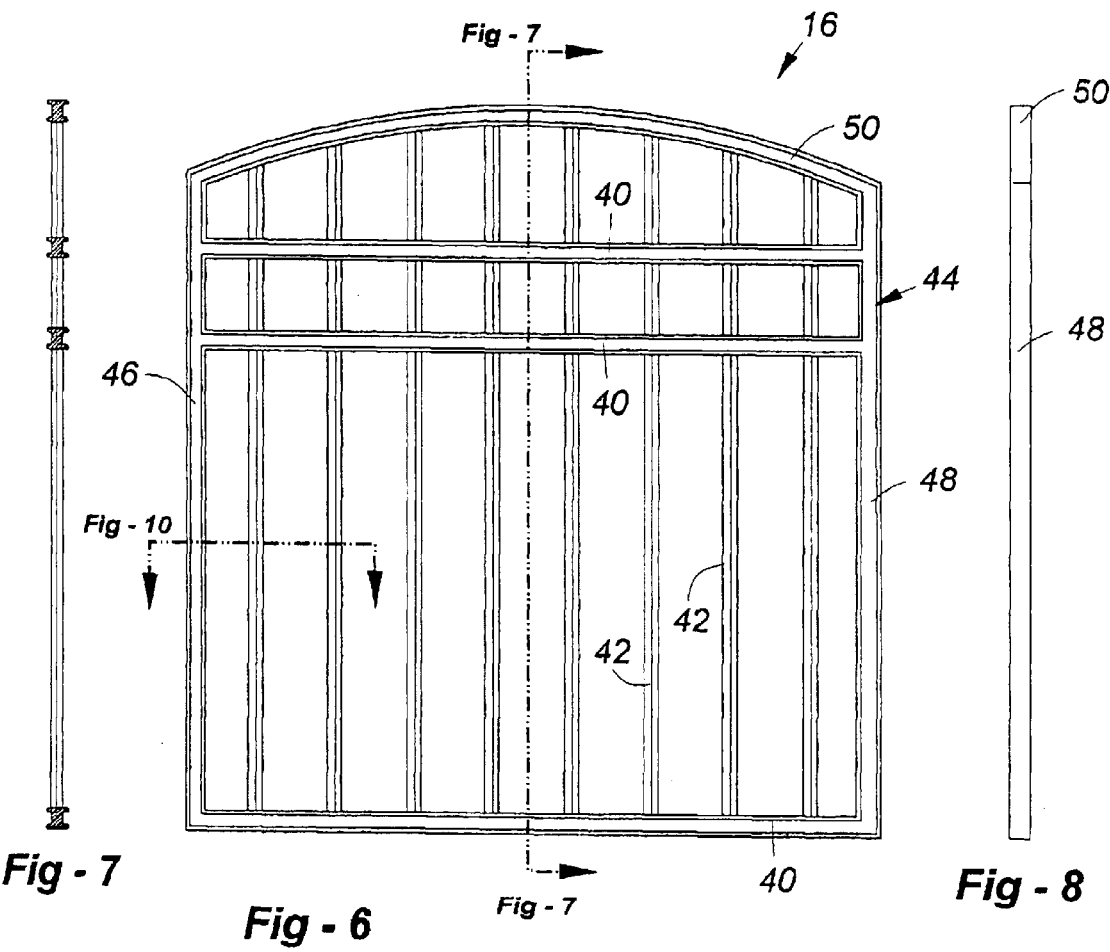
FIG. 9 is a bottom view of the gate of FIG. 6.

The vertical members 22 preferably have a diamond-shaped cross-section. The cross-section and design of these vertical members 22 is consistent from their upper end to their lower end, as shown. However, they appear to merge into or pass through the horizontal rails 20 such that the vertical members 22 appear continuous, despite actually being discontinuous, as best shown in FIG. 5. Each vertical member may be said to have a bottom portion 24 that extends from the underside of the lowest horizontal rail 20 downwardly to the bottom end of the vertical member 22. Each vertical member 22 further has a middle portion 26 that extends from the upper side of the bottommost horizontal rail to the underside of the lower of the two upper horizontal rails. An upper portion 28 extends between the two upper horizontal rails, and a topmost portion 30 extends from the upper side of the uppermost horizontal rail to the upper end of the vertical member 22. Each of the portions 24–28 preferably have the same cross-section and central axes that are aligned. A topmost portion 30 may include a portion having the same cross-section as portions 24–28 as shown in FIG. 1. Portion 30 also preferably has a central axis aligned with the central axis of portions 24–28. One design of injection-molded fencing may be provided with three horizontal rails 20 in the arrangement shown, along with a plurality of parallel vertical members 22 arranged in intervals along the horizontal rails 20. This provides a simple design simulative of wrought iron fencing.

Figure 3:
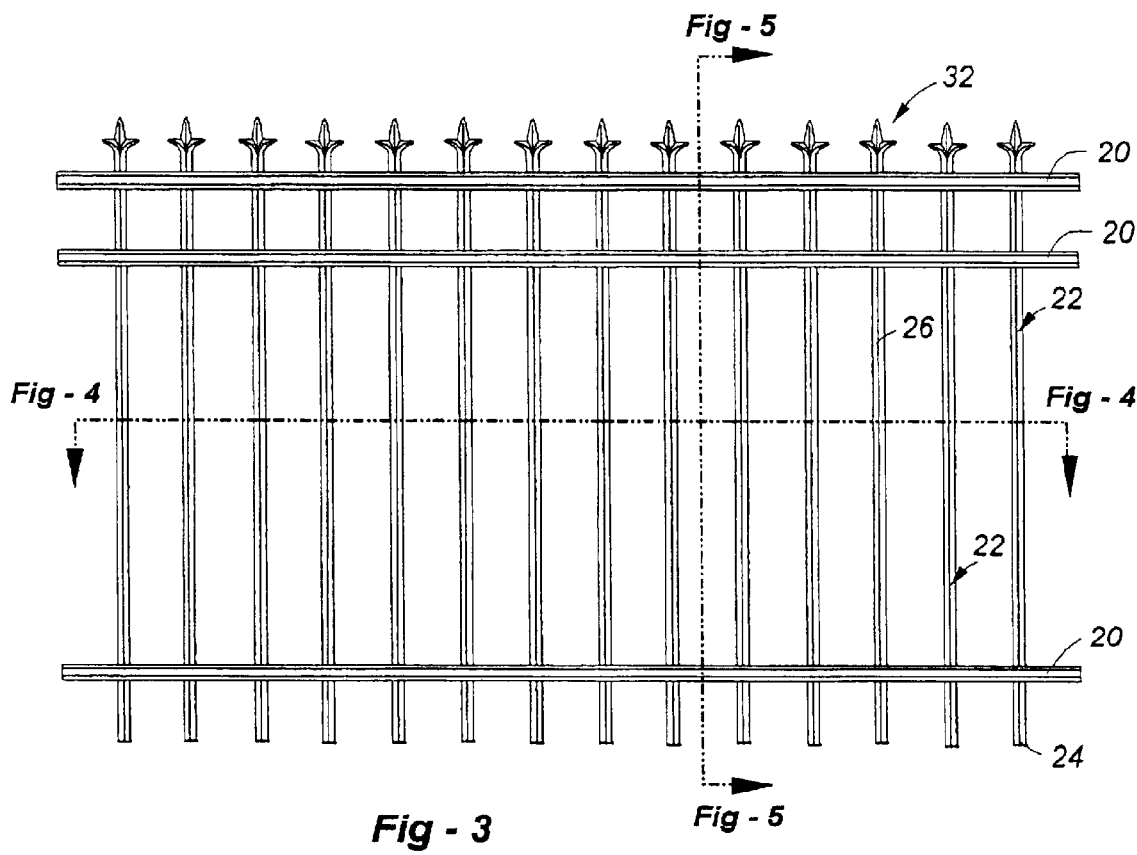
FIG. 3 is a front elevational view of the fence panel.
Figure 4:
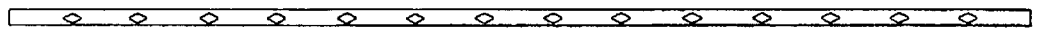
FIG. 4 is a bottom view of the fence panel of FIGS. 2 and 3 taken along lines 4—4.

As best shown in FIGS. 3 and 5, the uppermost end 30 of each of the vertical members 22 preferably terminate in a decorative finial, as is traditional with wrought iron fencing. As shown, each finial 32 has an upwardly extending point and a pair of sideways extending points. In the present invention, the points are preferably rounded to eliminate sharp points. As will be clear to those of skill in the art, different designs of finials may be used, or the finials may be eliminated, with each of the vertical members terminating either at the uppermost rail 20, or with a blunt end having the same cross-section as the remainder of the vertical member 22.

Figure 10:
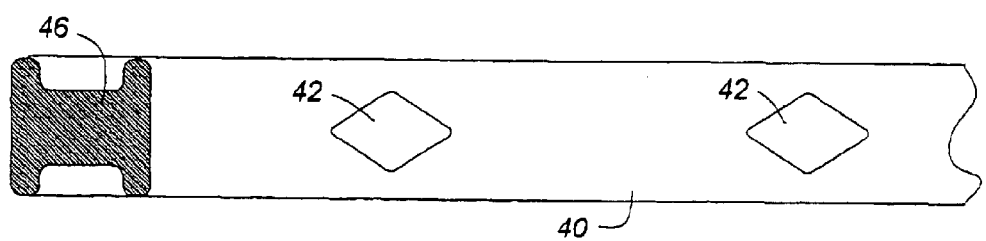
FIG. 10 is a cross-sectional view of a portion of the gate of FIG. 6, taken along the lines 10—10.

Referring now to FIGS. 6–10, the gate 16 will be described in more detail. The gate is constructed in a similar manner to the fence panel, and may be considered a fence panel for purposes of the present invention. It includes a plurality of straight horizontal rails 40 with a plurality of vertical members 42 extending between and interconnecting the horizontal rails 40. Additionally, the gate 16 preferably has a perimeter rail 44, which defines the perimeter of the gate 16. The perimeter rail includes the bottommost horizontal rail 40, a pair of vertical rails 46 and 48, and an arched top rail 50. The vertical members 42 preferably extend from the bottommost horizontal rail to the curved upper rail 50, and preferably do not extend above or below these rails. As with the fence panel 10, the vertical members 42 preferably have a diamond-shaped cross-section, as best shown in FIG. 10.

Figure 12:
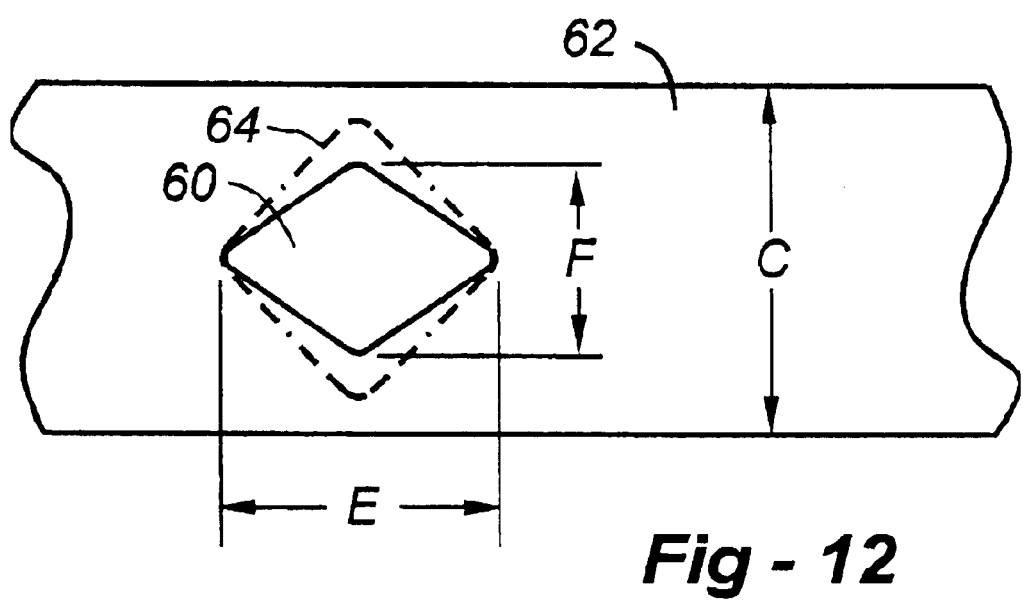
FIG. 12 is a cross-sectional view of a portion of a fence panel showing details of a vertical member.

FIG. 12 illustrates a cross-section of a single vertical member 60 where it abuts a horizontal rail 62. This vertical member 60 and horizontal rail 62 may be considered representative or a preferred embodiment of any of the vertical members and rails previously discussed. As shown, vertical member 60 preferably is thinner front-to-back than is the horizontal rail 62 as shown at C. Also, the vertical members are thinner front-to-back, F, than side-to-side, E. Alternatively, the vertical members may have the same thickness front-to-rear as side-to-side, as shown by dotted lines at 64. However, the reduced depth cross-section is preferred. This shape substantially reduces the total amount of plastic used to mold a panel, while still providing a convincing three-dimensional appearance. Additionally, the thinner front-to-back depth of the vertical members allows the panels to be stacked more densely, for instance during shipping and storage.

Figure 11:
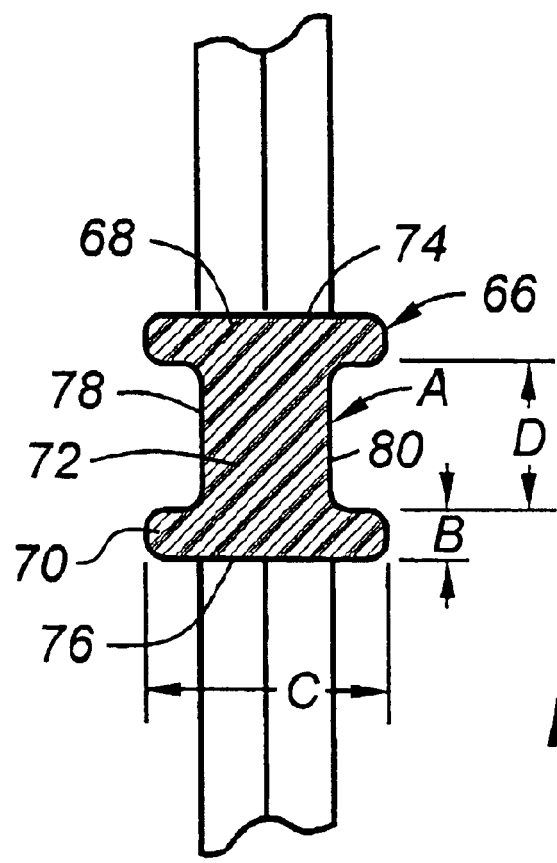
FIG. 11 is a detailed view of one horizontal rail that forms a portion of a fence panel.

Referring now to FIG. 11, the horizontal rails 66 preferably have an I-beam cross-sectional shape. This provides numerous advantages in the present invention. First, the I-beam cross-sectional shape provides a wide appearance while using less material than a solid cross-section with a square shape. Secondly, the I-beam shape has significant molding advantages. As shown, the I-beam cross-section has an upper leg 68 and a lower leg 70 interconnected by a central web 72. This provides thinner cross-sections in various areas, thereby facilitating cooling and accurate molding. In addition, the I-beam cross-section is strong and stiff. Example dimensions for the I-beam cross-section are as follows. The front-to-back depth of the central web 44 is indicated at A, and in some embodiments is approximately 0.625 inches. The height of the upper leg 40 or lower leg 42 is indicated at B, and in some embodiments is approximately 0.250 inches. The total width of the upper leg 40 or lower leg 42 is indicated by C, and may be approximately 1.125 inches. The height of the central web 44 is indicated at D and may be 1.00 inch, thereby giving a total height of the I-beam cross-section of approximately 1.5 inches.

As also shown in FIG. 11, the I-beam horizontal rail 66 preferably has a rounded profile. The horizontal rail 66 may be said to have an upper surface 74 defining the upper side of the upper leg 68 and a lower surface 76 defining the lower side of the lower leg 70. The central web 72 has a pair of opposed side surfaces 78 and 80. The side surfaces 78 and 80 radius into the undersides of the upper leg 68 and into the upper side of the lower leg 70. Likewise, the upper surface 74 and lower surface 76 radius around the outer edges of the I-beam cross-section. This smooth radiusing or rounding of the I-beam softens its appearance and also assists in the flow of plastic during the injection molding process.

Referring again to FIGS. 6 and 10, it is shown that the vertical side rails 46 and 48 of the gate 16 also have an I-beam cross-section. The present invention is not limited to the use of the discussed cross-sections for horizontal members. Instead, these cross-sections may be used for vertical or angled members in an injection-molded fence panel, as well as in other applications.

Referring again to FIG. 12, sample dimensions for the vertical member 60 will be described. As previously described, the front-to-back depth of the horizontal rail 62, as shown at C, is approximately 1.125 inches. The diamond-shaped cross-section 60 preferably has a front-to-back depth of approximately 0.625 inches, which is the same as the front-to-back depth, as shown at A, of the central web of the I-beam shaped horizontal rails. The diamond-shaped cross-section preferably has a side-to-side width, as shown at E, of approximately 0.834 inches. This is a ratio of depth-to-width of approximately 0.75. It is preferred that the depth-to-width ratio of the diamond-shaped members be less than 1.0, with it being more preferred that the ratio is below 0.9 or 0.8. The 0.75 ratio of the illustrated preferred embodiment is found to give a pleasingly three-dimensional appearance, while minimizing the use of materials and facilitating stacking. Ratios below 0.75 are also possible. As with the decorative finials and the I-beam cross-section, the diamond-shaped cross-section preferably is slightly rounded at each of the corners.

Figure 13:
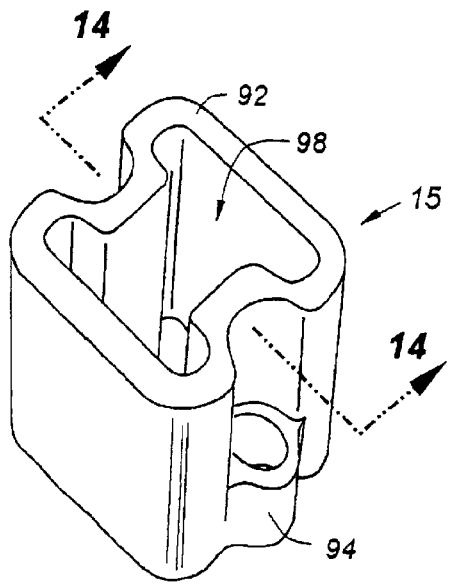
FIG. 13 is a perspective view of a fence bracket according to the present invention.
Figure 14:
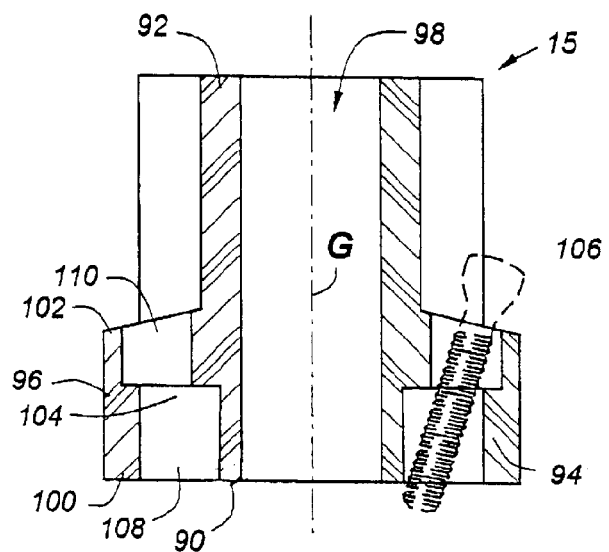
FIG. 14 is a cross-section view of the bracket of FIG. 13 taken along lines 14—14.
Figure 15:
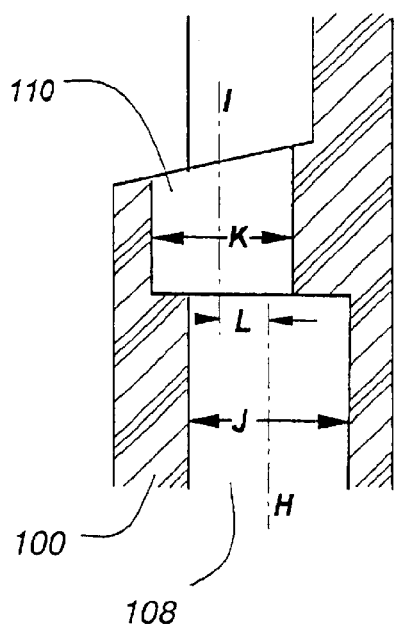
FIG. 15 is a cutaway view of the bracket of FIG. 13.

Referring now to FIGS. 13–15, a bracket 15 according to the present invention will be described. The bracket 15 is preferably injection-molded as a single piece which may be referred to as a bracket body. The bracket is designed to attach to an attachment surface, such as on a fence post. The bracket body 15 has an abutment surface 90 that abuts the attachment surface when the bracket is installed. The bracket body includes a central rail supporting portion 92 with a pair of attachment portions 94 and 96 extending therefrom. The rail supporting portion 92 has an opening 98 defined therein for receiving an end of one of the rails 20 of the fence panel 10. As shown, a preferred embodiment of the bracket according to the present invention has an opening 98 that is generally I-beam shaped so as to receive an I-beam shaped rail 20. Alternatively, the opening may have other shapes such as square, rectangular or round, or a specific shape to accommodate a specific rail shape. In the illustrated embodiment, the opening 98 extends from the abutment surface to the outer end of the bracket body 15. Preferably, the distance between the abutment surface 90 and the other end of the bracket body is large enough to provide a deep opening 98. The opening 98, in turn, is deep enough to allow for thermal expansion and contraction of the fence panels and for irregularities in assembly or construction. In one preferred embodiment, the opening has a depth of slightly over two inches. The opening is dimensioned to receive the horizontal rail of a fence panel, which has a front to back depth of about 1.125. The opening has a slight larger front to back width. Therefore, it is preferred that the opening 98 have a depth greater than its width. Preferably, the depth of the opening 98 is at least one inch, with one and a half inches being more preferred, and two inches being most preferred.

Alternatively, the opening may not pass all the way through the bracket body. Also, the opening may be somewhat tapered, from one or both ends, to allow mold separation if the bracket is injection-molded. The opening 98 may be said to have a central axis G. In the illustrated embodiment, the axis G is generally perpendicular to the abutment surface 90.

The attachment portions 94 an 96 are generally symmetrical in the illustrated embodiment, and extend from the sides of the central rail supporting portion 92. FIG. 14 best illustrates the construction of the attachment portions 94 and 96. Because they are symmetrical, only attachment portion 96 will be described in detail. The attachment portion 96 may be said to have a first surface 100 that forms at least a part of the abutment surface 90. The attachment portion 96 also has a second surface 102. A fastener receiving passage 104 is defined from the first surface 100 to the second surface 102 and is designed to receive a fastener, such as shown at 106 in attachment portion 94.

As will be clear to those of skill in the art, it is preferred that the fastener 106 is angled with respect to the central axis G. This allows easier access to the head of the fastener 106 with a screwdriver or power tool for engaging the fastener 106. It also very securely attaches the bracket 15 to the an attachment surface such as a post. Typically, a bracket in which a fastener is supposed to be guided at an angle will include an angled hole. Preferably, the bracket 15 is injection-molded from plastic. As will be clear to those of skill in the art, the mold for forming the bracket 15 would become significantly more complex if it were necessary to provide a hole angled with respect to the axis G. This is because a mold typically splits in two directions with the two halves moving in a direction parallel to the axis G. If a hole is angled to this axis, it is difficult to mold and still achieve extraction of the part from the mold. The present invention overcomes this difficulty. According to the present invention, the passage 104 is provided by a first bore 108 that extends from the first surface 100 towards a second surface 102 and a second bore 110 that extends from the second surface 102 towards the first surface 100. The first and second bores interconnect to define the passage 104. The first bore 108 has a central axis H and the second bore 110 has a central axis I. Both of the axes H and I are generally parallel to the central axis G of the opening 98. However, the central axis H of the bore 108 is offset with respect to the central axis I of the bore 110, with the axis H being closer to the axis G. This results in the passage 104 guiding a fastener, such as 106, at an angle with respect to the axis G. The bore 108 may be said to have a width or diameter J, while the bore 110 may be said to have a width or diameter K. An offset distance L is shown as the distance between the generally parallel axis H and I. Preferably, to guide a fastener at an angle, the offset distance L is greater than the difference between the radii of the bores 108 and 110. Alternatively, this may be expressed as the distance L being greater than half the difference between the diameters J and K. By making L larger than half the difference between the diameters of the bores, the sidewalls of the two bores are offset sufficiently to cause a fastener to be guided at an angle.

Preferably, the diameter J of the bore 108 is larger than the diameter of K of the bore 110. In one embodiment, the bore 110 has a diameter at the surface 102 of approximately 0.33 inches while the bore 108 has a diameter at the surface 100 of approximately 0.4 inches. As will be clear to those of skill in the art, because the bracket 15 is preferably molded, each of the bores 108 and 110 taper slightly for mold release. The diameters of the bores may be considered to be the diameters at the intersection of the two bores, or an average diameter of each bore. In the same embodiment, the bracket has a height, from the abutment surface to the opposite surface, of approximately two inches. The drawings are approximately to scale.

As will be clear to those of skill in the art, the plastic fence components disclosed herein may be molded or formed in various ways. The fence panels may be molded such that the horizontal rails and vertical members are each solid plastic, as illustrated. One preferred material is glass fiber filled polypropylene. Alternatively, the plastic fencing may be low-pressure injection molded with gas assist. This process may lead to hollowing out of some of the horizontal rails or vertical members, due to the gas assist. This, in turn, reduces the amount of plastic required to form the plastic fencing.

According to a further aspect of the present invention, the molded plastic fence panels and components achieve the look of wrought iron. According to a preferred embodiment of the present invention, this is achieved by using a 30 percent glass filled polypropylene with a carbon black coloring. This combination achieves the somewhat dulled black surface of wrought iron. Reducing or eliminating the glass fiber in the polypropylene would lead to a shiny surface that would not effectively simulate wrought iron. As will be clear to those of skill in the art, this combination of materials may be used in other applications. For this purpose, the present invention recognizes the preferability of using short glass fibers to provide a 30 percent glass filled polypropylene with carbon black. Glass fiber concentrations above 25 percent are also preferred, though 30 percent or more is most preferred.

As will be clear to those of skill in the art, the present specification and figures illustrate only preferred embodiments of the present invention, and the various shapes, sizes and configurations may be altered without departing from the scope or teaching of the present invention. It is the following claims, including all equivalents, which define the scope of the present invention.

We claim:

1. A bracket for supporting an elongated rail with respect to a post having an attachment surface, the rail having an end, the bracket comprising:
   a bracket body having a rail supporting portion and an attachment portion, the bracket body having an abutment surface, the bracket body having an installed position wherein the abutment surface is positioned against the attachment surface of the post;
   the rail supporting portion having an opening defined therein for receiving the end of the rail when the bracket body is in the installed position, the opening having a central axis;
   the attachment portion having a first surface forming at least part of the abutment surface of the body and a second surface spaced therefrom, a fastener receiving passage defined from the first surface to the second surface, the passage formed by a first bore extending from the first surface part way to the second surface and a second bore extending part way from the second surface to the first surface, the first and second bores interconnecting to define the passage, the first and second bores each having central axes that are generally parallel to the central axis of the opening in the rail supporting portion, the first bore having a first width and the second bore having a second width, an offset dimension defined as half the difference between the first width and the second width, the central axis of the first bore being offset from the central axis of the second bore by a distance greater than the offset dimension such that a fastener extending through the passage is guided into an position that is angled with respect to the central axis of the opening in the rail supporting portion.

2. The bracket according to claim 1, wherein the central axes are each generally perpendicular to the abutment surface.

3. The bracket according to claim 1, wherein the central axis of the first bore is offset from the central axis of the second bore in a direction generally perpendicular to the central axis of the opening in the rail supporting portion.

4. The bracket according to claim 3, wherein the central axis of the first bore is closer to the central axis of the opening than the central axis of the second bore is to the central axis of the opening.

5. The bracket according to claim 1, wherein the first width is greater than the second width.

6. The bracket according to claim 1, wherein the bores are each generally cylindrical.

7. The bracket according to claim 1, wherein the attachment portion is a first attachment portion, the bracket further comprising a second attachment portion substantially symmetrical to the first attachment portion.

8. The bracket according to claim 1, wherein the first and second bores interconnect at a connection opening, the connection opening being biconvex.

9. The bracket according to claim 1, wherein the bracket is integrally formed by molding.

10. A bracket for supporting an elongated rail with respect to a post having an attachment surface, the rail having an end, the bracket comprising:
    a bracket body having a rail supporting portion and an attachment portion, the bracket body having an abutment surface, the bracket body having an installed position wherein the abutment surface is positioned against the attachment surface of the post;
    the rail supporting portion having an opening defined therein for receiving the end of the rail when the bracket body is in the installed position, the opening having a central axis;
    the attachment portion having a first surface forming at least part of the abutment surface of the body and a second surface spaced therefrom, a fastener receiving passage defined from the first surface to the second surface, the passage formed by a first bore extending from the first surface part way to the second surface and a second bore extending part way from the second surface to the first surface, the first and second bores interconnecting to define the passage, the first and second bores each having central axes that are generally parallel to the central axis of the opening in the rail supporting portion, the central axis of the first bore being offset from the central axis of the second bore such that a fastener extending through the passage is urged into a position that is angled with respect to the central axis of the opening in the rail supporting portion.

11. The bracket according to claim 10 wherein the central axes are each generally perpendicular to the abutment surface.

12. The bracket according to claim 10, wherein the central axis of the first bore is offset from the central axis of the second bore in a direction generally perpendicular to the central axis of the opening in the rail supporting portion.

13. The bracket according to claim 12, wherein the central axis of the first bore is closer to the central axis of the opening than the central axis of the second bore is to the central axis of the opening.

14. The bracket according to claim 10, wherein the first bore has a width greater than a width of the second bore.

15. The bracket according to claim 10, wherein the bores are each generally cylindrical.

16. The bracket according to claim 10, wherein the attachment portion is a first attachment portion, the bracket further comprising a second attachment portion substantially symmetrical to the first attachment portion.

17. The bracket according to claim 10, wherein the first and second bores interconnect at a connection opening, the connection opening being biconvex.

18. The bracket according to claim 10, wherein the bracket is integrally formed by molding.

19. An attachment member for attaching to an attachment surface, the attachment member comprising:

a body having an abutment surface, the body having an installed position wherein the abutment surface is positioned against the attachment surface, a perpendicular axis being defined as perpendicular to the abutment surface;

the body having an outer surface spaced from the abutment surface, a fastener receiving passage defined from the outer surface to the abutment surface, the passage formed by a first bore extending from the abutment surface part way to the outer surface and a second bore extending part way from the outer surface to the abutment surface, the first and second bores interconnecting to define the passage, the first and second bores each having central axes that are generally parallel to the perpendicular axis, the first bore having a first width and the second bore having a second width, an offset dimension defined as half the difference between the first width and the second width, the central axis of the first bore being offset from the central axis of the second bore by a distance greater than the offset dimension such that a fastener extending through the passage is guided into an position that is angled with respect to the perpendicular axis.

* * * * *

UNITED STATES PATENT AND TRADEMARK OFFICE
CERTIFICATE OF CORRECTION

PATENT NO. : 6,877,722 B2
DATED : April 12, 2005
INVENTOR(S) : Richard W. Cantley et al.

It is certified that error appears in the above-identified patent and that said Letters Patent is hereby corrected as shown below:

Column 5,
Line 63, "94 an 96" should be replaced with -- 94 and 96 --.

Column 6,
Line 12, "to the an attachment" should be replaced with -- to an attachment --.

Column 7,
Line 58, "an position" should be replaced with -- a position --.

Column 10,
Line 12, "an position" should be replaced with -- a position --.

Signed and Sealed this

Thirteenth Day of September, 2005

JON W. DUDAS
*Director of the United States Patent and Trademark Office*